United States Patent [19]
Griffini et al.

[11] Patent Number: 5,765,287
[45] Date of Patent: Jun. 16, 1998

[54] CUTTING HEAD FOR NYLON-CORD TYPE MOWERS

[75] Inventors: Alberto Griffini, Pontiloro; Mirco Stefani, Bagnolo in Piano, both of Italy

[73] Assignee: Active s.r.l., Cremona, Italy

[21] Appl. No.: 761,784

[22] Filed: Dec. 6, 1996

[30] Foreign Application Priority Data

Dec. 18, 1995 [EP] European Pat. Off. ............ 95119940

[51] Int. Cl.⁶ .................... A01D 34/67; A01G 3/06
[52] U.S. Cl. ............ 30/276; 56/12.7; 242/125.1; 242/388.1; 242/584
[58] Field of Search .................. 30/276, 347; 242/18 R, 242/125.1, 388.1, 388.3, 532.6, 584; 56/12.7

[56] References Cited

U.S. PATENT DOCUMENTS

| | | | |
|---|---|---|---|
| 3,809,331 | 5/1974 | Gaul | 242/388.1 |
| 4,097,991 | 7/1978 | Proulx | 30/276 |
| 4,177,561 | 12/1979 | Ballas | 30/276 |
| 4,571,831 | 2/1986 | White, III | 30/276 |
| 4,625,501 | 12/1986 | Baba | 30/276 X |
| 4,640,084 | 2/1987 | Baba | 30/276 X |
| 4,644,655 | 2/1987 | Bottamiller et al. | 30/347 |
| 4,882,843 | 11/1989 | Baba | 30/276 |
| 4,959,904 | 10/1990 | Proulx | 30/276 |
| 5,109,607 | 5/1992 | Everts | 30/276 |
| 5,276,968 | 1/1994 | Collins et al. | 30/276 |
| 5,345,683 | 9/1994 | Kanou | 30/276 |
| 5,398,416 | 3/1995 | Mackey | 30/276 X |

FOREIGN PATENT DOCUMENTS

| | | |
|---|---|---|
| 0 203 011 A2 | 11/1986 | European Pat. Off. |
| 0 525 195 A1 | 2/1993 | European Pat. Off. |
| 0 585 720 A1 | 3/1994 | European Pat. Off. |
| 2-38275 | 2/1990 | Japan ............ 242/388.1 |
| 2166115 | 4/1986 | United Kingdom ........ 242/388.1 |

*Primary Examiner*—Eugenia Jones
*Attorney, Agent, or Firm*—Joseph W. Molasky & Associates

[57] ABSTRACT

A cutting head for a nylon-cord mower and the like, comprising a case housing an inner spool on which it is wound at least a length of nylon cord, elastically loaded by a helical spring, with the two ends of said nylon cord protruding through pairs of annular members mounted on said case in diametrally opposed locations. The inner spool is formed by a cylindrical body with at least two holes aligned along an axis intersecting the axis of the spool, and that can be axially aligned with the two annular members for allowing the replacement of the nylon cord without opening the cutting head.

11 Claims, 4 Drawing Sheets

CUTTING HEAD FOR NYLON-CORD TYPE MOWERS

BACKGROUND OF THE INVENTION

The present invention generally refers to those devices known as grass mowers, i.e. hand-held motorized tools for cutting low vegetation like grass and weeds, and more particularly refers to nylon-cord grass mowers.

These devices are provided with a long handle which carries at one end a so-called cutting head from which two lengths of nylon cord protrude for cutting the grass when the head is rotated. The cutting head generally provides a cylindrical case formed by a body and a cover, and housing a spool on which a supply of nylon cord or line is wound.

Cutting heads of this kind are generally employed in cutters for lawn mowing as well as for farming use. The nylon cord is wound on a spool or bobbin that is "coiled", i.e. is elastically biased to rotate backwards by the cord wound on the spool, and the two cord ends freely extend outside the head passing through two diametrally opposed annular members. The motor of the device causes the cutting head to rotate and the centrifugal force maintains the outer portions of the nylon cord radially straight and acting as blades. During the use, the outside extending lengths of cord are worn out (by breaking) and the worn out lengths are replaced by releasing a certain amount of the nylon cord wound on the inner spool, so as to maintain a predeterminded length of the protruding nylon line, typically of about 20 cm. The rotation of the spool for unwinding an amount of nylon cord can be accomplished manually, by compressing a central spring and rotating the two parts by a fraction of a complete turn, until two series of equally spaced radial projections on the facing surfaces of the cover and the spool engage with each other.

Alternatively, the lower part of the cutting head, facing the ground when the mower is used, can be provided with a central button, the so-called "tapping" button. By tapping this button against a solid surface the central spring is temporarily compressed and the spool is free to rotate until the next engagement between the projections. Such a tapping button can therefore be used to rotate the inner spool for increasing the length of the two portions of nylon cord extending outside.

A common drawback of these known devices arises when the nylon cord supply has to be replaced because its overall length has become too short, and then the spool must be "coiled", that is the nylon cord has to be wound on the inner spool, for being later extracted in a controlled manner from the head.

There are known devices in which when the nylon cord supply is exhausted the operator must open the cutting head, remove the spool, anchor a new cord supply to members provided on the cutting head, wind at least partially the new cord supply on the spool, thread the cord ends into the annular guide members provided on the body of the cutting head, and close the cutting head after correctly fitting the central spring and properly positioning the components. Then the new nylon cord has to be completely wound up, against its return force, by using in a reverse manner the mechanism that in use will allow the extraction of the cord.

The above operations are complex and require a long time. Additionally, opening and reassembling the cutting head in the field often lead to losing components such as the spring or the annular members, in the grass.

In EP-A-0 525 195 there has been proposed a nylon-cord cutting head from which the nylon cord is extracted by a tapping action, equipped with a spool bored orthogonally to its rotation axis, that allows for the replacement of the nylon cord supply without disassembling the device. Such cutting head is equipped with triangular D-shaped pawls, cooperating with a stopper pin housed in a hole diametrically formed within the case.

However, such an arrangement provides for a stationary hub with a transverse pin, so that the through hole in the spool does not extend diametrically. For replacing the exhausted cord supply it is necessary to open windows formed on the cover, and thread the nylon cord into the annular members with the fingers, or by using a tool.

Moreover in spite of the fact that the cutting head is of the tapping action type, the cover of the device has to be manually rotated in order to wind up the nylon cord, with the engagement between the stopper pin and the triangular pawls allowing to wind up the nylon cord on the spool.

Another drawback of the known cutting heads comes from the undesired friction bonding between the coils of the cord when the mower is used.

Finally in the conventional devices there are used different components for machines providing for a manual extraction of the cord and those employing the tapping action, and such manufacturing differences increase the production and maintenance costs of such devices.

SUMMARY OF THE INVENTION

The object of the present invention is to overcome the above mentioned drawbacks, and more particularly to realize a cutting head for a mower or similar machine that allows for a nylon cord replacement without requiring the opening thereof.

In accordance with a further aspect, the cutting head of the invention allows for winding the nylon cord on the spool by using the same tapping mechanism provided for extracting the nylon line.

In accordance with another aspect the cutting head of the invention can be of the type requiring a manual operation for extracting the nylon cord.

According to the invention, the above objects are accomplished by means of a device as claimed in claim 1.

Additional advantageous features are claimed in the dependent claims.

The invention will now be disclosed with reference to the attached drawings that show some preferred but non limiting embodiments of the invention.

DESCRIPTION OF PREFERRED EMBODIMENTS

Figure 1:
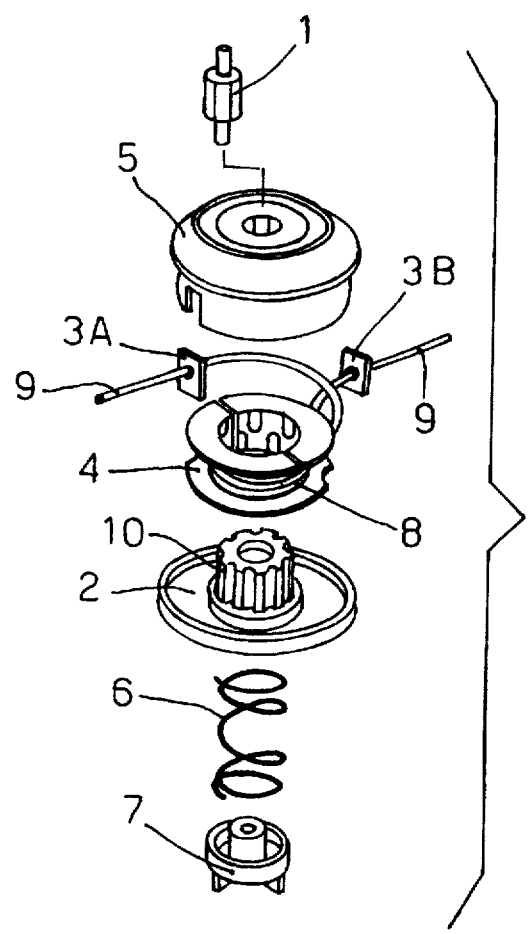
FIG. 1 is an exploded view illustrating the general construction of a known nylon-cord cutting head.

With reference to FIG. 1, there is shown the general construction of a nylon-cord cutting head, comprising a case, formed by a body 5 and a base 2, that houses a spool 4 on which a certain amount of nylon cord 8 is wound.

The spool is fitted on a support member 10 projecting from the base 2 and rotatable about a central shaft 1 secured to the body 5, and is elastically biased by a coil spring 6 located within the support member 10 and blocked by a plug 7. The two ends 9 of the single nylon cord 8 protrude outside of the cutting head passing through two annular guide member or eyelets 3A, 3B mounted on the case in diametrically opposed locations.

As above mentioned, in a conventional cutting head such as the one shown in FIG. 1, in order to insert a new nylon cord supply and wind it on the spool it is necessary to disassemble the base 2, to remove the spool and wind the nylon cord on it, and then the ends 9 of the cord are to be inserted into the annular members 3A, 3B, and finally the cutting head can be closed.

Figure 2:
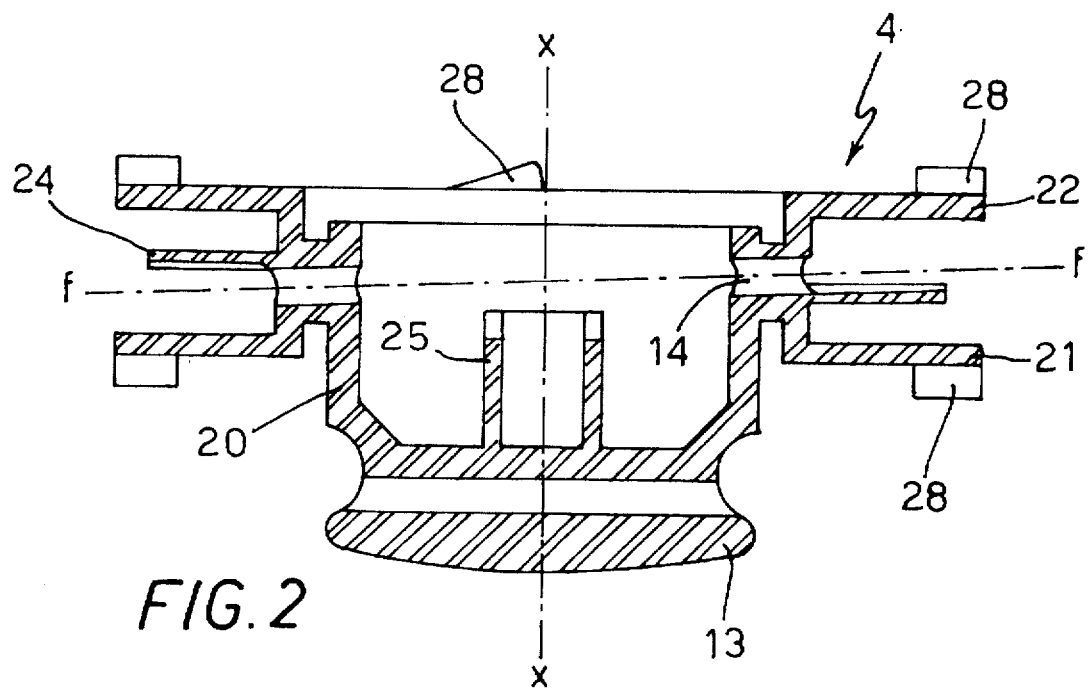
FIG. 2 is a cross-section side view of spool for an improved cutting head in accordance with the present invention.

In FIG. 2 there is shown the construction of a preferred embodiment of a spool for the improved cutting head according to the invention, comprising an inner spool 4 mounted between the base 2 and a body 5 (not shown in FIG. 2). The spool 4 comprises a cylindrical portion 20 and an inner bushing 25 coaxial with, and perhaps integral to, cylindrical portion 20, and in either case secured to a button 13 for the tapping operation, the bushing 25 prevents the slip off of the shaft 1 when the cutting head is disassembled. As a general rule, in FIG. 2 and in the other Figures the same references of FIG. 1 have been used for parts having similar or corresponding functions.

The nylon cord 8 (not shown in the Figure) is wound on the cylindrical portion 20 of the inner spool 4 and such cylindrical portion is provided with two lateral flanges 21 and 22 which besides containing the nylon cord, also carry a number of projecting members 28, 28A peripherically and radially spaced, adapted to engage the inclined surfaces of teeth 12, 12A (or similar components) provided on the case, preferably on both portions 2 and 5 of the case, and properly offset in the radial direction, as will be better illustrated later on. Preferably the projecting members 28, 28A and 12, 12A are all formed as pawls having a triangular cross section, with an inclined face and a vertical face which is substantially parallel to the axis of the spool 4.

In the embodiment illustrated in FIG. 2, the body 20 is further provided with at least one radially extending intermediate annular separator 24 and one through hole, formed by two holes 14 aligned along an axis f—f intersecting the spool axis x—x, with said holes passing through the body 20 and (partially) the inner bushing 25. The separator 24 advantageously prevents the overlapping of the nylon coils, so as to avoid the friction bonding between the coils when the mower is used.

In accordance with the most general concept of the present invention, more than one pair of aligned holes can be provided in the spool. Nevertheless when a single nylon cord is inserted into the aligned holes of a pair, the holes of such pair can simply be considered as the two parts of a single hole passing in correspondence of a point of the axis x—x of the spool.

Preferably the axis f—f of the holes 14 is slightly inclined with respect to a plane perpendicular to the spool axis of rotation x—x. As shown in FIG. 2, the two holes 14 are located so that one of them lies above the separator 24, and the other below the separator. However, as a general rule, the holes 14 are located within that portion of body 20 defined by the flanges 21, 22. Since the axial distance between two aligned holes depends on the size of the spool, the tilting of the axis f—f of the holes 14 of a pair varies within a relatively wide range. Indicatively, for cutting heads of conventional size, the angle formed by the axis f—f with the axis x—x of the spool is from 50° to 90°.

Holes 14 can be axially aligned with the two annular members 3A and 3B by rotating the body of the cutting head with respect to the spool. At a position marked on the spool, the holes 14 and the annular members 3A, 3B are substantially aligned with each other to form a channel. Under such condition, the user can simply thread the end of a new nylon cord supply 8 through the cutting head and, after checking the proper length of the two ends 9 protruding from the cutting head, wind the spool 4 by manually rotating the tapping button until all the nylon cord 8 has been wound on the spool.

Figure 3:
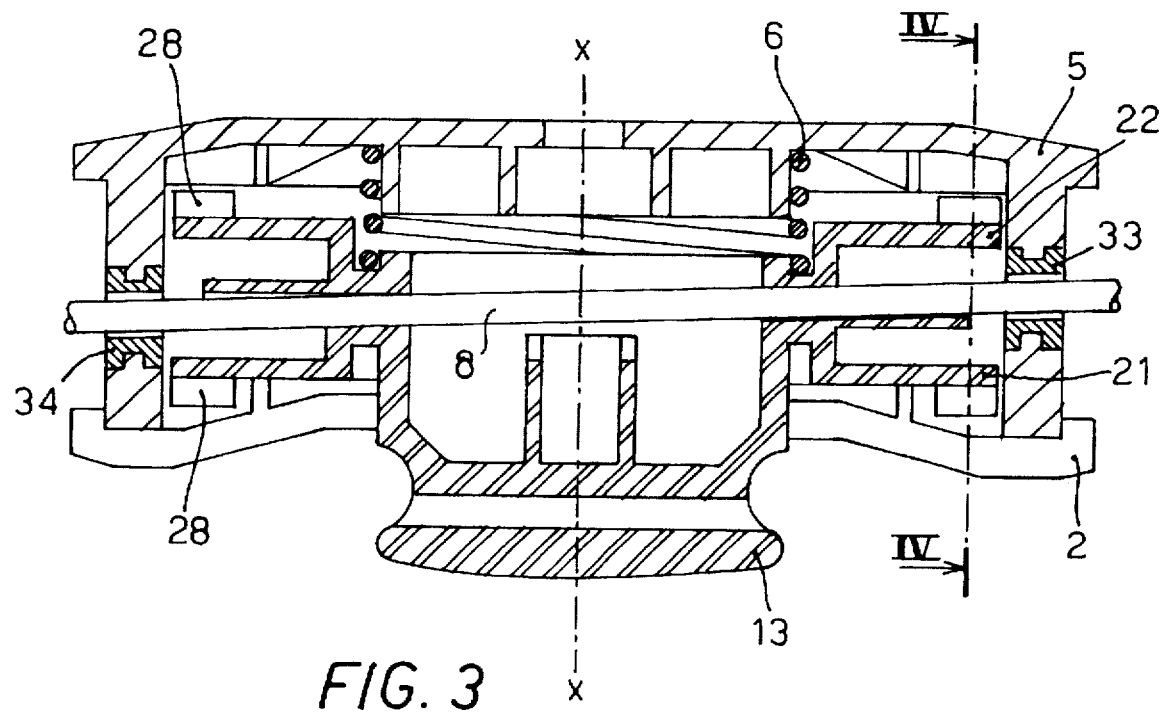
FIG. 3 shows a cross section of an embodiment of the cutting head of the invention, of the tapping type.

FIG. 3 shows a cross section of an embodiment of the complete cutting head according to the invention, provided with the tapping feature. As shown in FIG. 3, the helical spring 6 is preferably located between the cover 5 and the spool 4, while the button 13 is located on the opposite side with respect to the spring, and this construction allows the tapping operation.

Figure 4:
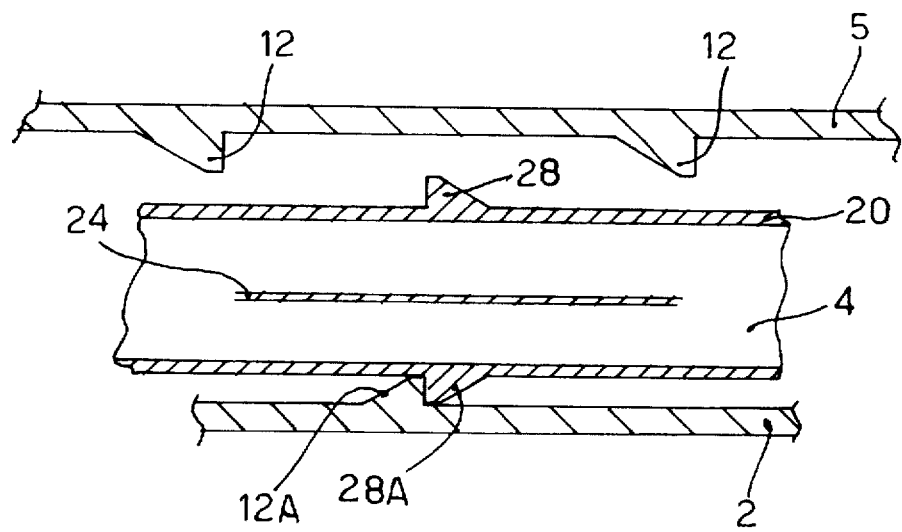
FIG. 4 is a cross section along line IV—IV in FIG. 3.

FIG. 4 is a partial cross section showing with more details the engagement members 28 and 28A provided on the flanges 21 and 22 of the spool 4 that face the teeth or pawls 12 and 12A formed on the cover 5 and the base 2, respectively.

Therefore, according to the invention, for "coiling" the nylon cord 8 onto the spool after the nylon cord has been threaded through the transverse channel formed by aligning the annular members 3A and 3B with the holes 14 of the spool, the operator only rotates clockwise the button 13 (and therefore the spool 4), while maintaining stationary the assembly made up by the cover 5 and the base 2.

This way the radial engagement members or pawls 28A and the pawls 12A having a triangular cross section come to contact with their inclined faces and during their relative displacement axially compress the spring 6 until the two parallel faces of the pawls cause a snapping axial movement and the pawls reach the relative position shown in FIG. 4.

In operation the spool 20 is blocked against the return rotation—which would be caused by the tension of the two rotating cord portions—by the engagement between the vertical faces of the pawls or projections.

Preferably, as shown in FIG. 4, pawls 12 are provided both on the cover 5 and on the base 2, so that when using the tapping mechanism during mowing, when the button 13 is kept pushed upwards, the pawls 12—angularly offset by a certain amount in respect of the pawls 12A—contact the pawls 28 thus stopping the rotation of the spool and preventing an uncontrolled extraction of the nylon cord. By selecting the number of the pawls and the offset angle between the pawls 12 and 12A, a predetermined length of nylon cord 8 can be released at each axial movement of the button 13. Such solution allows to use the same components for both the tapping and the manual models of the cutting head, as will be better illustrated in the following with reference to FIGS. 6 and 7.

Figure 5:
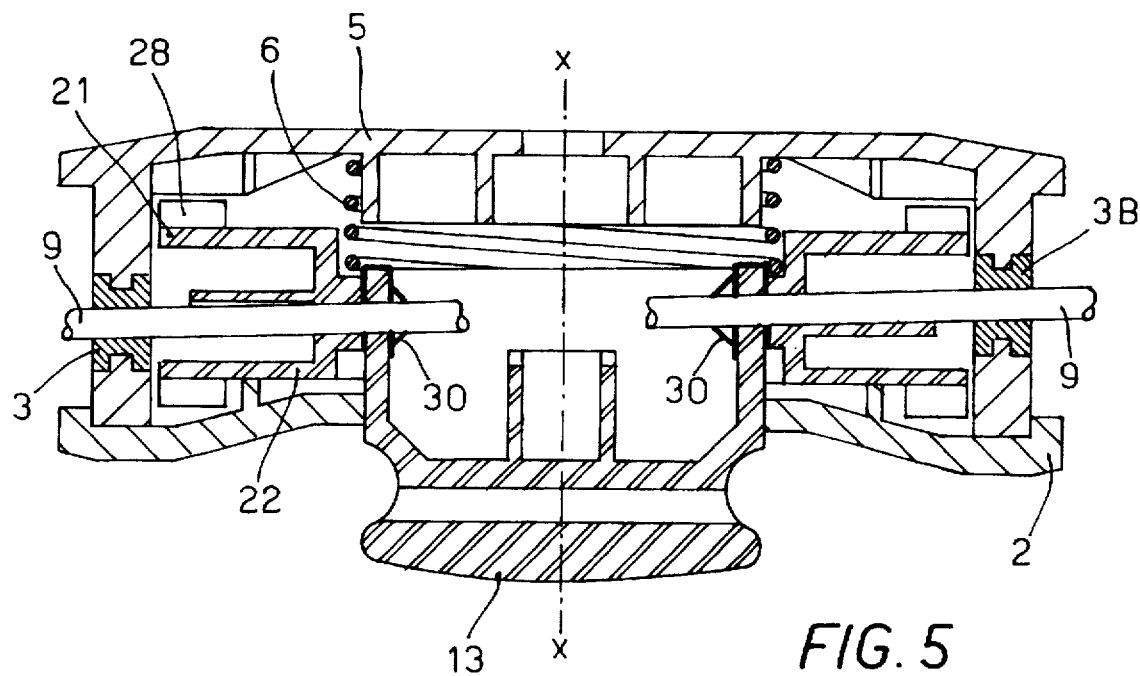
FIG. 5 shows a cross section of another embodiment of a cutting head according to the invention.

According to the embodiment shown in FIG. 5, within the body of the spool 20, which is formed integral with or secured to the button 13, there are provided means 30 for engaging and retaining the ends of the cords, at least in respect of moderate tractive forces, and the cutting head is equipped with a pair (or pairs) of nylon cords.

Figure 8:
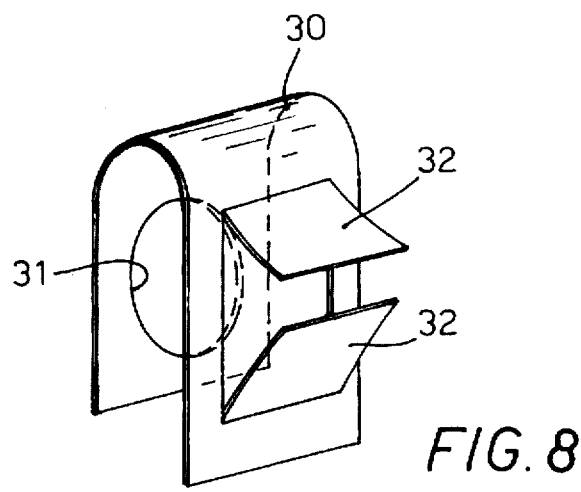
FIG. 8 shows a construction of the means for engaging and retaining the ends of the nylon cords.

The engagement means 30 can comprise a metal sheet or a small pawl adapted to be deformed and/or moved by the incoming end of the nylon cord, and capable of retaining with a certain amount of force the nylon cord to prevent the extraction thereof. After one or two coils of cords have been wound on the body of the spool, the forces generated by friction and the coils overlapping are sufficient to prevent the radial extraction when the head is rotated in use. An example of such retaining means, shown in FIG. 8, comprises a U-folded sheet member adapted to be elastically fitted onto the body of the spool, with an arm provided with a hole 31, and the other arm provided with elastic retaining tabs 32.

Preferably the retaining member 30 is formed by a U-folded metal sheet, on which a hole 31 has been drilled and tabs 32 have been punched in advance, and the tabs are then deformed into an opened configuration.

Figure 9:
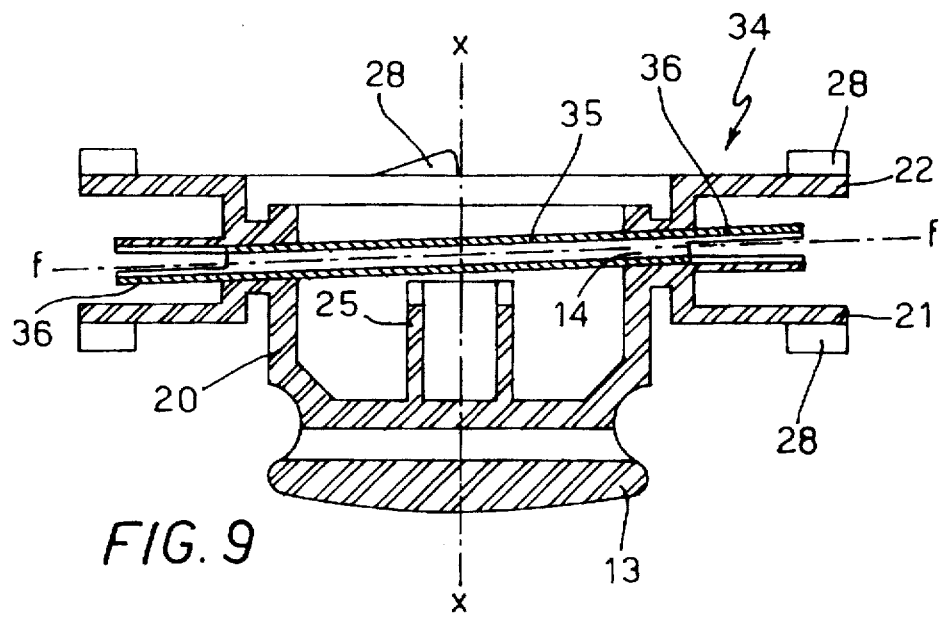
FIG. 9 is a cross-section side view of illustrating another embodiment of the spool.

FIG. 9 illustrates another embodiment of the spool 34 in which a metal tube 35, e.g. a brass tube, is inserted into the holes 14 with end portions 36 protruding therefrom.

The tube 35 is a guide member for making easier the threading of the nylon cord into the cutting head. After the end of the nylon cord has come out from the spool 34, the tube 35 can be removed. However, according to an embodiment of the invention the tube can be permanently secured to the spool. In such case the end portions 36 are longitudinally slotted, assuming a C-shape cross section so that the nylon cord can be wound on the spool. In FIG. 9 the same references of FIG. 2 have been used for the other components so that no further description is required.

In the proposed construction, the cutting head can be refurnished by means of a pair (or pairs) of shorter nylon cord lines without requiring any modification or difficulty in the costruction thereof. This allows for a better use of the nylon cord 8 by reducing the wastes, and allows for the replacement of only one of the nylon cords of a pair.

Of course there are possible other different embodiments of the engagement means. In accordance with a further embodiment, not illustrated but easy to be understood, a cutting head with two or more lengths of nylon cords is not actually provided with dedicated engagement means, but nevertheless the nylon cords—after one or two coils have been wound on the spool—are safely retained by friction.

Advantageously, in this last mentioned embodiment the two short lengths of cords left when the nylon cord supply is refurnished simply fall down by gravity. On the other hand in the previously illustrated embodiment equipped with engagement means 30 the remaining lengths of cord can be extracted by pushing them with a moderate force.

Particularly in the two last illustrated embodiments, the cutting head can use a larger number of nylon cords protruding from the head, such as four or six.

Figure 6:
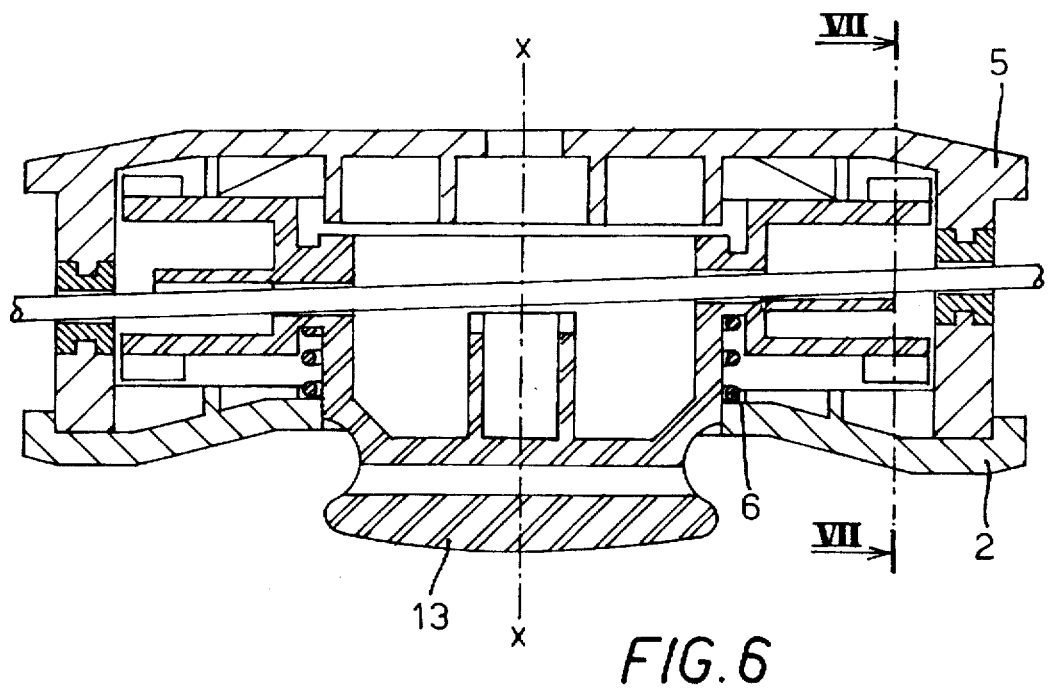
FIG. 6 shows a cross section of an embodiment of a cutting head according to the invention, of the manual extraction type.
Figure 7:
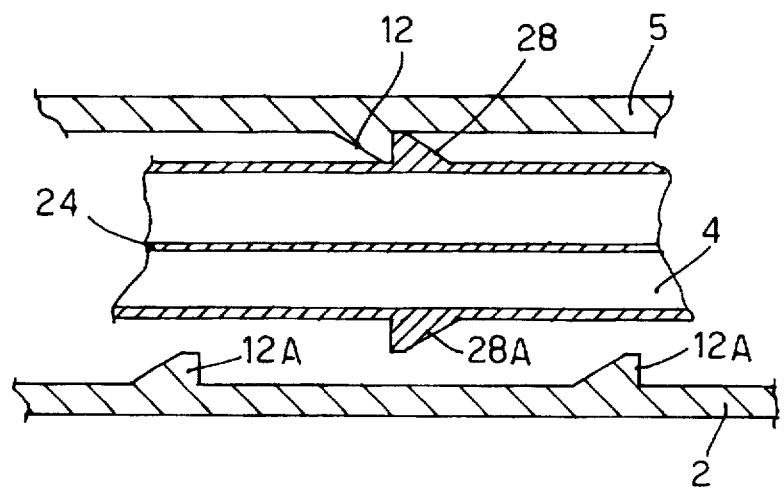
FIG. 7 is a cross section along line VII—VII in FIG. 6.

In the embodiment shown with reference to FIGS. 6 and 7, the spring 6 is positioned between the base 2 of the case and the spool 4, thus obtaining a "manual" working of the device. In this case, with the motor of the device shut off, the operator will pull the button 13 downwards and rotate it counterclockwise, thus causing the releasing of a predetermined length of nylon cord. FIG. 7 illustrates how in this operation are involved the upper projections 28 and the pawls 12 provided on the cover 5. A solution of this kind is of advantage when the cutting head is to be used in stony fields where the unintentional impact against a stone could trigger the tapping device should the button 13 of this latter embodiment be located in the lower facing surface. It is further evident that the components of such embodiment are equal to those of the "tapping" embodiment shown in FIG. 3.

We claim:

1. A cutting head for a nylon-cord mower, said cutting head comprising a case including a pair of diametrically opposed annular members, said members for allowing each end of an associated nylon cord to protrude therethrough;

an inner spool disposed within said case, said inner spool comprising a cylindrical body, two peripheral flanges formed on either end of said cylindrical body, and a pair of diametrically opposed apertures formed through the surface of said cylindrical body, said pair of apertures disposed along an inclined axis with respect to a spool axis of rotation and capable of being aligned with the pair of diametrically opposed annular members, wherein when said apertures are aligned with said annular members, a nylon cord may be inserted completely therethrough and thereafter wound onto said inner spool without separating said inner spool from said case.

2. A cutting head as defined in claim 1 wherein the cutting head further comprises a tapping button integral with said spool, said tapping button for releasing a nylon cord when the cutting head is in operation and for winding a replacement nylon cord onto the spool when the cutting head is empty.

3. A cutting head as defined in claim 1 wherein the cutting head further comprises a tapping button secured to said spool, said tapping button for releasing a nylon cord when the cutting head is in operation and for winding a replacement nylon cord onto the spool when the cutting head is empty.

4. A cutting head as defined in claim 1 wherein the inclination between the axis of the opposed apertures and the rotation axis is between 50 degrees and 90 degrees.

5. A cutting head as defined in claim 1 wherein the spool further comprises an annular separator disposed between the pair of peripheral flanges and positioned such that one aperture of said pair of apertures is disposed above said separator and the remaining aperture of said pair of apertures is disposed below said separator.

6. A cutting head as defined in claim 1 wherein the inner spool further comprises a pair of engagement means, each engagement means disposed to cover a separate one of the pair of apertures, said engagement means for engaging and retaining a nylon cord passing therethrough.

7. A cutting head as defined in claim 6 wherein each engagement means comprises a U-shaped member for fitting onto said inner spool, the U-shaped member having a first arm including a hole to align with a aperture and a second arm including a pair of elastic retaining tabs.

8. A cutting head as defined in claim 1 wherein at least one flange of the inner spool is provided with radial engagement members cooperating with radial pawls or teeth having a triangular shape, provided on at least one portion of the case and facing said at least one flange.

9. A cutting head as defined in claim 1 wherein the pair of peripheral flanges of the inner spool are provided with radial engagement members, the members provided on a first flange of said pair of flanges being angularly offset with respect to the engagement members provided on a second, remaining flange of said pair of flanges.

10. A cutting head as defined in claim 1, wherein a spring is disposed between the case and the inner spool, thus allowing the release of an included nylon cord by means of a tapping mechanism.

11. A cutting head as defined in claim 1, wherein a metal tube is permanently inserted through the pair of opposing apertures and secured to the cylindrical body, said metal tube including longitudinally slotted end portions and formed to comprise a length greater than the diameter of the cylindrical body so that said end portions protrude beyond said cylindrical body.

* * * * *